(12) United States Patent
Koyanagi

(10) Patent No.: US 9,160,380 B2
(45) Date of Patent: Oct. 13, 2015

(54) TRANSMISSION CIRCUIT, COMMUNICATION SYSTEM AND TRANSMISSION METHOD

(71) Applicant: FUJITSU LIMITED, Kawasaki (JP)

(72) Inventor: Yoichi Koyanagi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 13/684,619

(22) Filed: Nov. 26, 2012

(65) Prior Publication Data

US 2013/0195125 A1 Aug. 1, 2013

(30) Foreign Application Priority Data

Feb. 1, 2012 (JP) .................................. 2012-019822

(51) Int. Cl.
*H04B 1/04* (2006.01)
(52) U.S. Cl.
CPC .................................... *H04B 1/0483* (2013.01)
(58) Field of Classification Search
CPC ..... H04N 21/2368; H03M 9/00; G11C 19/00; G06F 1/08
USPC .................................. 370/537; 375/295, 233
See application file for complete search history.

(56) References Cited

U.S. PATENT DOCUMENTS

| | | | |
|---|---|---|---|
| 6,603,418 B2 * | 8/2003 | Al-Awadhi | 341/144 |
| 7,557,615 B1 * | 7/2009 | Tran et al. | 326/82 |
| 7,679,396 B1 * | 3/2010 | Kao | 326/27 |
| 7,982,638 B2 | 7/2011 | Yamaguchi | |
| 8,446,942 B2 * | 5/2013 | Hasegawa et al. | 375/233 |
| 2004/0071203 A1 * | 4/2004 | Gorecki | 375/229 |
| 2004/0131089 A1 | 7/2004 | Uemura et al. | |
| 2008/0212607 A1 * | 9/2008 | Batty et al. | 370/464 |
| 2009/0303806 A1 * | 12/2009 | Edo et al. | 365/189.12 |
| 2010/0164539 A1 * | 7/2010 | Balamurugan et al. | 326/30 |
| 2010/0289677 A1 | 11/2010 | Choi | |
| 2011/0163791 A1 * | 7/2011 | Kanda | 327/315 |
| 2012/0119792 A1 * | 5/2012 | Wang et al. | 327/108 |

FOREIGN PATENT DOCUMENTS

| | | |
|---|---|---|
| JP | 2002-281095 A | 9/2002 |
| JP | 2005-141860 A | 6/2005 |
| JP | 4723029 B2 | 7/2011 |
| WO | 2010/032699 A1 | 3/2010 |

* cited by examiner

*Primary Examiner* — Joseph Bednash
(74) *Attorney, Agent, or Firm* — Fujitsu Patent Center

(57) ABSTRACT

Provided is a transmission circuit that includes first and second drive circuits. A first digital signal at a data rate of a predetermined period length is input to the first drive circuit. A second digital signal at the data rate of the predetermined period length shifted by ½ of the predetermined period length relative to the first digital signal is input to second drive circuit. The outputs of the first drive circuit and the second drive circuit are connected. The connected output indicates the maximum level or the minimum level when the value of the first digital signal and the value of the second digital signal are the same. The connected output indicates a level between the maximum level and the minimum level when the value of the first digital signal and the value of the second digital signal are different.

7 Claims, 12 Drawing Sheets

TRANSMISSION CIRCUIT, COMMUNICATION SYSTEM AND TRANSMISSION METHOD

CROSS-REFERENCE TO RELATED APPLICATIONS

This application is based upon and claims the benefit of priority of prior Japanese Patent Application No. 2012-019822, filed on Feb. 1, 2012, the entire contents of which are incorporated herein by reference

FIELD

The embodiments relate to a communication system.

BACKGROUND

In the Ethernet (registered trademark) standard, etc., the data rate is increased from 10 Gbit/s to 25 Gbit/s. Accompanying this, the data rate of the serial data transmission circuit included in the SerDes (SERializer/DESerializer) and the serial data transmission circuit is also increased to 25 Gbit/s.

With reference to FIGS. 1A to 1C, a conventional serial data transmission circuit is explained. FIG. 1A is a diagram illustrating a conventional serial data transmission circuit 101. FIG. 1B is a diagram illustrating a time chart of the serial data transmission circuit 101.

The serial data transmission circuit 101 configured to output serially four digital signals input in parallel has a divide-by-2 frequency divider circuit 110, 2:1 multiplexers 120, 121, and 122, and a driver circuit 130. When driving an output signal at a data rate of 25 Gbit/s, to the divide-by-2 frequency divider circuit 110 and the 2:1 multiplexer 122, a clock signal CK of 12.5 GHz corresponding to a waveform [PA] of FIG. 1B is provided. The divide-by-2 frequency divider circuit 110 divides the frequency of the provided clock signal CK and provides a divide-by-2 signal of 6.25 GHz corresponding to a waveform [PB] of FIG. 1B to the 2:1 multiplexers 120 and 121. The 2:1 multiplexer 120 outputs one of first and third digital signals $D_{in0}$ and $D_{in2}$ that are input based the divide-by-2 signal provided from the divide-by-2 frequency divider circuit 110. The digital signal output from the 2:1 multiplexer 120 corresponds to a waveform [PC] of FIG. 1B. Further, the 2:1 multiplexer 121 outputs one of second and fourth digital signals $D_{in1}$ and $D_{in3}$ that are input based the divide-by-2 signal provided from the divide-by-2 frequency divider circuit 110. The digital signal output from the 2:1 multiplexer 121 corresponds to a waveform [PD] of FIG. 1B. Furthermore, the 2:1 multiplexer 122 outputs one of the digital signals input from the 2:1 multiplexers 120 and 121 in a clock period CK indicated by 12.5 GHz in FIG. 1A. The digital signal output from the 2:1 multiplexer 122 corresponds to a waveform [PE] of FIG. 1B. Then, an output signal $V_{out}$ output from the 2:1 multiplexer 122 is transmitted to a transfer path via the driver circuit 130.

RELATED DOCUMENTS

[Patent Document 1] Japanese Patent No. 4723029

SUMMARY

According to an aspect of the embodiments, a transmission circuit includes a first drive circuit and a second drive circuit. A first digital signal at a data rate of a predetermined period length is input to the first drive circuit, and the first drive circuit is configured to output a signal corresponding to the first digital signal. A second digital signal at the data rate of the predetermined period length shifted by ½ of the predetermined period length relative to the first digital signal is input to second drive circuit, and the second drive circuit is configured to output a signal corresponding to the second digital signal. The outputs of the first drive circuit and the second drive circuit are connected. The connected output indicates the maximum level or the minimum level when the value of the first digital signal and the value of the second digital signal are the same. The connected output indicates a level between the maximum level and the minimum level when the value of the first digital signal and the value of the second digital signal are different.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, a transmission circuit, a communication system, and a transmission method in accordance with embodiments are explained in detail with reference to the drawings. The drawings attached to the present specification are intended for explanation of the embodiments and not to indicate size ratios of components. In each of the drawings, the same or like symbols are attached to components having the same or like functions. As to components having the same or like functions as those of the components explained previously, there may be a case where their explanation is not given again.

Figure 2A:
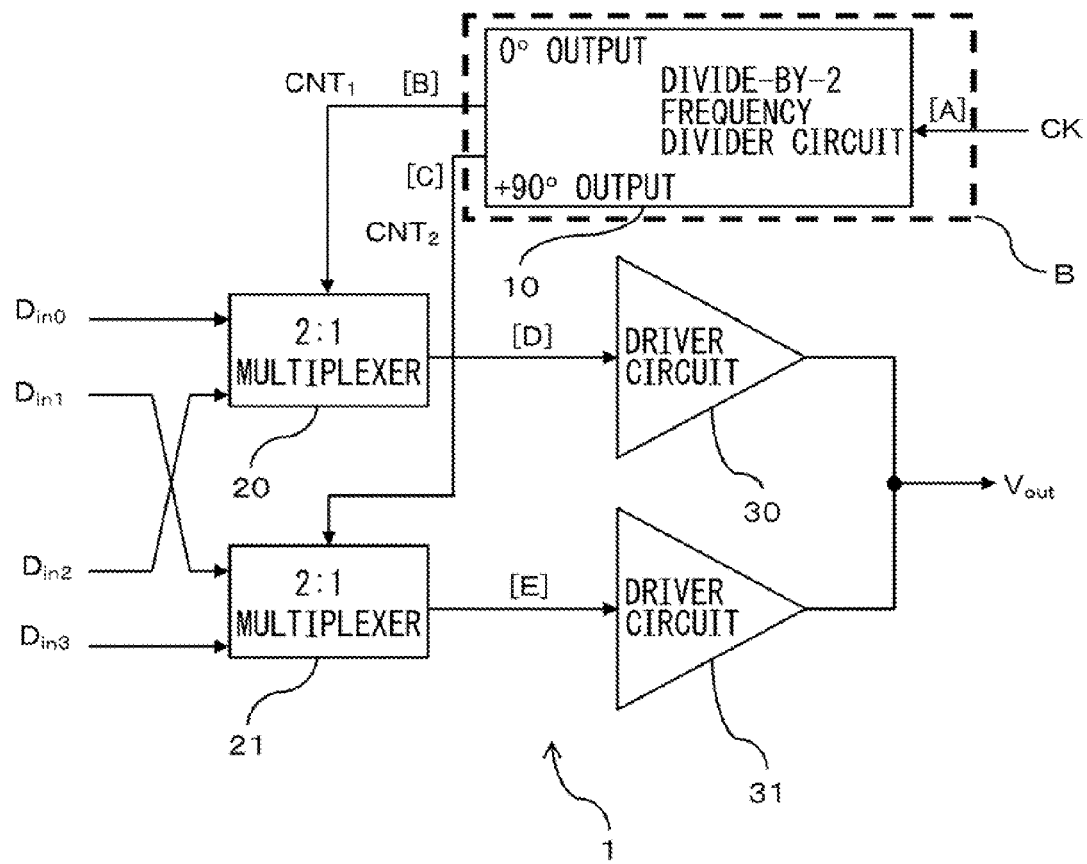
FIG. 2A is a diagram illustrating a serial data transmission circuit of an embodiment.
Figure 2B:
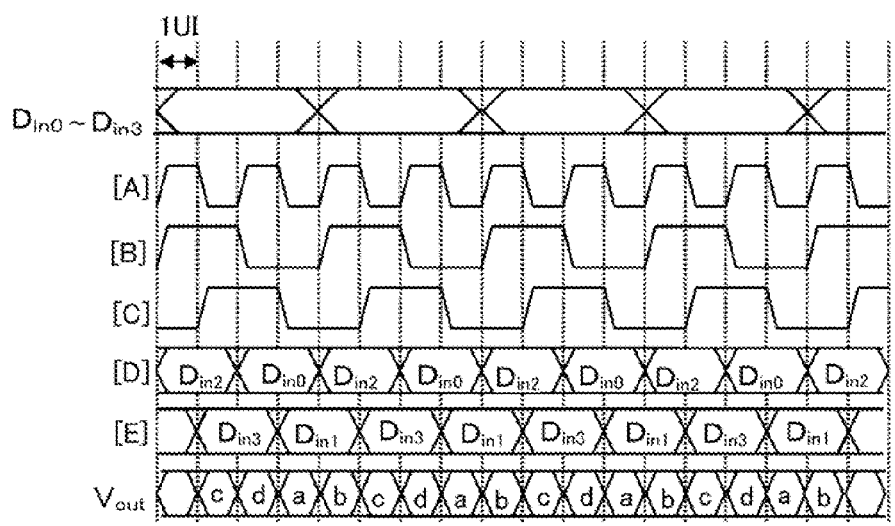
FIG. 2B is a diagram illustrating a serial data transmission circuit of an embodiment.
Figure 3:
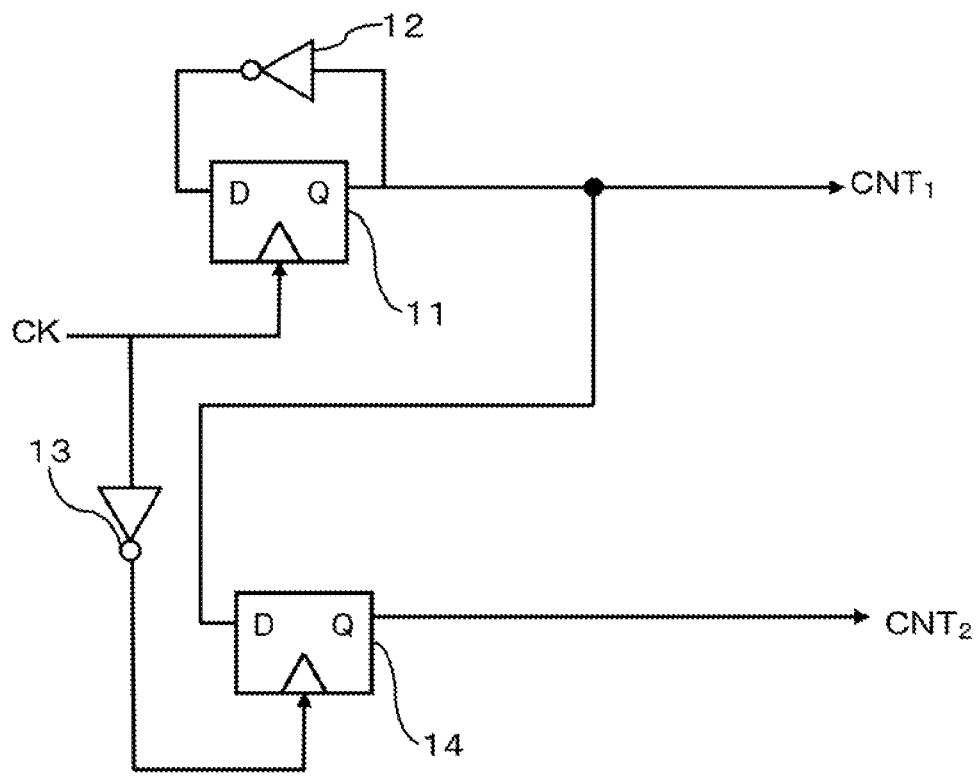
FIG. 3 is diagram illustrating an example of a circuit of a frequency divider circuit of the serial data transmission circuit illustrated in FIG. 2.
Figure 4:
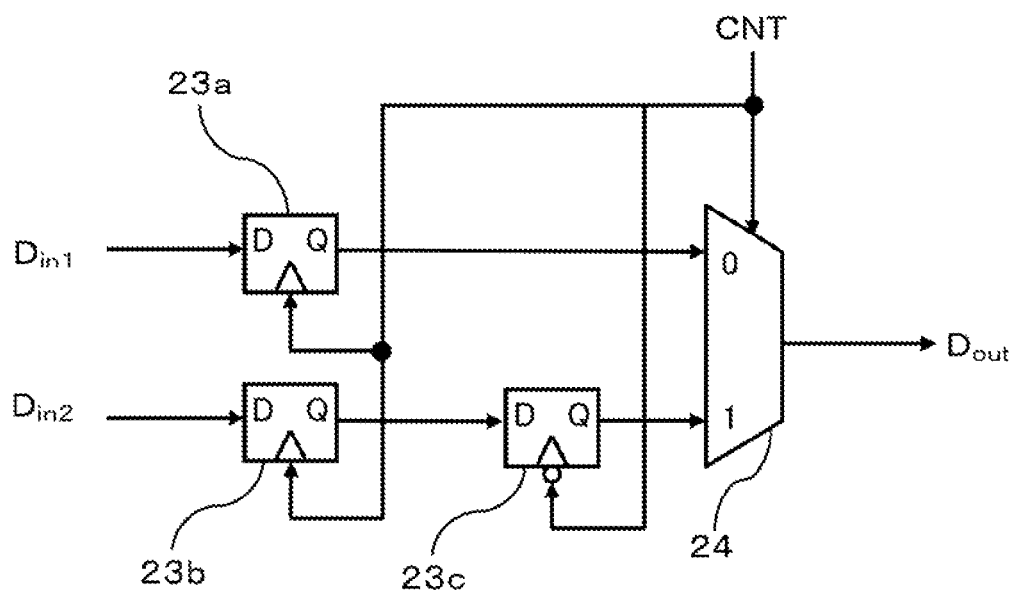
FIG. 4 is a diagram illustrating an example of a circuit of a 2:1 multiplexer of the serial data transmission circuit illustrated in FIG. 2.
Figure 5:
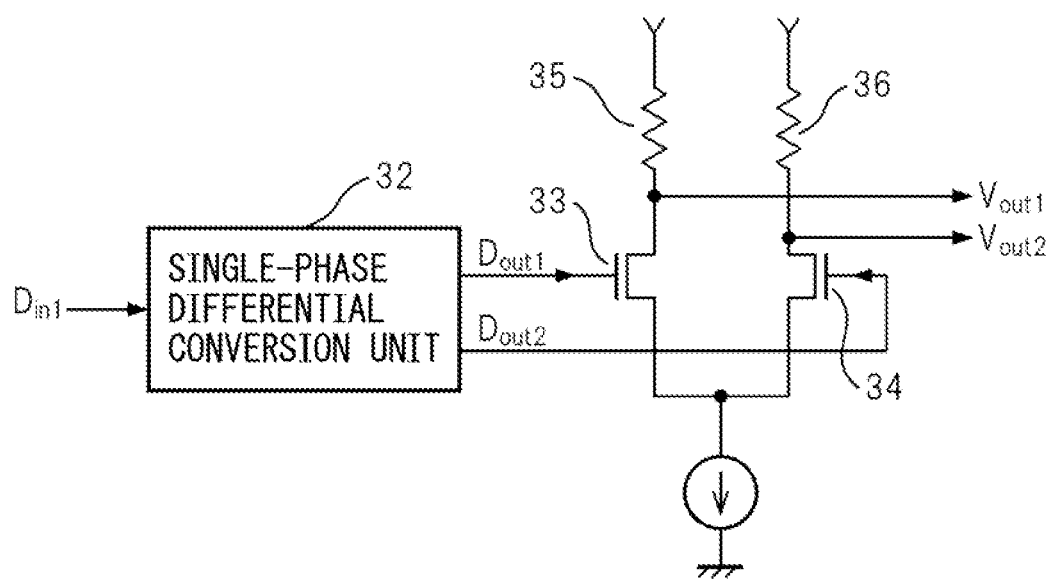
FIG. 5 is a diagram illustrating an example of a circuit of a driver circuit of the serial data transmission circuit illustrated in FIG. 2.

Hereinafter, with reference to FIGS. 2 to 13, the transmission circuit, the communication system, and the transmission method according to the embodiments are explained. First, with reference to FIG. 2 to FIG. 5, a serial data transmission circuit 1 is explained. FIG. 2A is a diagram illustrating a block of the serial data transmission circuit 1. FIG. 2B is a diagram illustrating a time chart of the serial data transmission circuit 1. FIG. 3 is a diagram illustrating an example of a circuit of a divide-by-2 frequency divider circuit 10 of the serial data transmission circuit 1. FIG. 4 is a diagram illustrating an example of a circuit of 2:1 multiplexers 20 and 21 of the serial data transmission circuit 1. FIG. 5 is a diagram illustrating an example of a circuit of driver circuits 30 and 31 of the serial data transmission circuit 1.

As illustrated in FIG. 2A, the serial data transmission circuit 1 configured to serially output four digital signals input in parallel has the divide-by-2 frequency divider circuit 10, the 2:1 multiplexers 20 and 21, and the driver circuits 30 and 31. A clock signal CK is input to the divide-by-2 frequency divider circuit 10, and the divide-by-2 frequency divider circuit 10 outputs first and second control signals $CNT_1$ and $CNT_2$, which is the clock signal CK divided by 2. The second control signal $CNT_2$ has a phase difference corresponding to ½ of the period of the clock signal CK relative to the first control signal $CNT_1$. That is, the second control signal $CNT_2$ has a delay difference of ½ of the period of the clock signal CK relative to the first control signal $CNT_1$.

The 2:1 multiplexer 20 selectively outputs a signal corresponding to one of first and third digital signals $D_{in0}$ and $D_{in2}$ input in parallel based on the first control signal $CNT_1$. The 2:1 multiplexer 21 selectively outputs a signal corresponding to one of second and fourth digital signals $D_{in1}$ and $D_{in3}$ input in parallel based on the second control signal $CNT_2$. The driver circuit 30 outputs the digital signal output from the 2:1 multiplexer 20 as an analog signal. The driver circuit 31 outputs the digital signal output from the 2:1 multiplexer 21 as an analog signal. The outputs of the driver circuits 30 and 31 are connected. Thus, an output signal $V_{out}$ is a signal formed by combining the analog signal output from the driver circuit 30 and the analog signal output from the driver circuit 31.

As illustrated in FIG. 3, the divide-by-2 frequency divider circuit 10 has D flip-flops 11 and 14 and inverters 12 and 13. The D flip-flop 11 inputs a signal output from an output terminal Q to an input terminal D via the inverter 12. Then, the D flip-flop 11 outputs the first control signal $CNT_1$ having a period twice that of the clock signal CK by outputting an inverted signal for each rising edge of the clock signal CK. The D flop-flop 14 inputs the signal of the output terminal Q of the D flip-flop 11 to the input terminal D. An inverted signal of the clock signal CK is input to a clock terminal of the D flip-flop 14 via the inverter 13. Then, the D flip-flop 14 outputs the second control signal $CNT_2$ having a period twice that of the clock signal CK by outputting the $CNT_1$ signal in synchronization with the falling edge of the clock signal CK. The phase difference between the second control signal $CNT_2$ and the first control signal $CNT_1$ is a period ½ of the period of the clock signal CK.

As illustrated in FIG. 4, the 2:1 multiplexer 20 has D flip-flops 23a, 23b, and 23c and a multiplexer 24. The D flip-flops 23a and 23b latch a digital signal input to the input terminal D at the rising edge of a control signal CNT input to a CK terminal and outputs the signal from the output terminal Q. The D flip-flop 23c latches a digital signal input to the input terminal D at the falling edge of the control signal CNT input to the CK terminal and outputs the signal from the output terminal Q. The multiplexer 24 outputs a signal output from the output terminal Q of the D flip-flop 23a when the control signal CNT is 0 as an output signal $D_{out}$. Further, the multiplexer 24 outputs a signal output from the output terminal Q of the D flip-flop 23c when the control signal CNT is 1 as the output signal $D_{out}$. The 2:1 multiplexer 21 has the same configuration as the 2:1 multiplexer 20.

As illustrated in FIG. 5, the driver circuit 30 has a single-phase differential conversion unit 32, first and second transistors 33 and 34, and first and second resistors 35 and 36. The single-phase differential conversion unit 32 converts the input digital signal $D_{in1}$ into first and second differential output signals $D_{out1}$ and $D_{out2}$. The first and second transistors 33 and 34 are CMOS transistors. The first and second transistors 33 and 34 output analog signals $V_{out}$ and $V_{out2}$ respectively in accordance the digital signals $D_{out1}$ and $D_{out2}$ input to the gate terminal. The first and second resistors 35 and 36 are terminating resistors having a resistance of 50Ω.

Next, with reference to the time chart illustrated in FIG. 2B, the operation of the serial data transmission circuit 1 is explained. The waveforms $D_{in0}$ to $D_{in3}$ of FIG. 2B illustrate the digital signals $D_{in0}$ to $D_{in3}$ input in parallel of FIG. 2A. A waveform [A] of FIG. 2B illustrates the waveform of the clock signal CK of FIG. 2A. A waveform [B] of FIG. 2B illustrates the waveform of the first control signal $CNT_1$ of FIG. 2A. A waveform [C] of FIG. 2B illustrates the waveform of the second control signal $CNT_2$ of FIG. 2A. A waveform [D] of FIG. 2B illustrates the waveform of the output digital signal of the 2:1 multiplexer 21 of FIG. 2A. A waveform [E] of FIG. 2B illustrates the waveform of the output digital signal of the 2:1 multiplexer 21 of FIG. 2A. The waveform $V_{out}$ of FIG. 2B illustrates the waveform of the output analog signal $V_{out}$ of FIG. 2A.

The waveforms $D_{in0}$ to $D_{in3}$ have the same period as the waveform of the clock signal CK illustrated in the waveform [B]. The waveforms [B] and [C] are signals, which is the clock signal CK divided by 2, and have a delay difference of a period ½ of that of the clock signal CK. Then, the delay difference between the waveforms [B] and [C] can be said to have a phase difference of 90° in the relationship with the period of the digital signal waveforms $D_{in0}$ to $D_{in3}$ having a period twice that of the clock signal CK.

The waveform [D] illustrates a waveform in which the digital signal corresponding to the first digital signal $D_{in0}$ is latched at the rising edge of the waveform [B] and the digital signal corresponding to the third digital signal $D_{in0}$ is latched at the rising edge and the falling edge of the waveform [B], and which is output selectively in each period ½ of that of the waveform [B]. That is, when the waveform [B] is 0, the waveform [D] is a signal corresponding to the first digital signal $D_{in0}$ and when the waveform [B] is 1, the waveform [D] is a signal corresponding to the third digital signal $D_{in2}$.

The waveform [E] illustrates a waveform in which the digital signal corresponding to the second digital signal $D_{in1}$ is latched at the rising edge of the waveform [C] and the digital signal corresponding to the fourth digital signal $D_{in3}$ is latched at the rising edge and the falling edge of the waveform [C], and which is output selectively in each period ½ of that of the waveform [C]. That is, when the waveform [C] is 0, the waveform [E] is a signal corresponding to the second digital signal $D_{in1}$ and when the waveform [C] is 1, the waveform [E] is a signal corresponding to the fourth digital signal $D_{in3}$.

The output waveform $V_{out}$ is a signal formed by combining the waveform [D] and the waveform [E] as an analog signal. That is, a waveform a illustrated in the output waveform $V_{out}$ is a signal formed by combining signals corresponding to the first digital signal $D_{in0}$ and the second digital signal $D_{in1}$, respectively, as an analog signal. A waveform b is a signal formed by combining signals corresponding to the second digital signal $D_{in1}$ and the third digital signal $D_{in2}$, respectively, as an analog signal. A waveform c is a signal formed by combining signals corresponding to the third digital signal $D_{in2}$ and the fourth digital signal $D_{in3}$, respectively, as an analog signal. A waveform d is a signal formed by combining signals corresponding to the fourth digital signal $D_{in3}$ and the first digital signal $D_{in0}$, respectively, as an analog signal. Thus, the output signal $V_{out}$ is an analog signal when the waveform [D] and the waveform [E] are (0, 0), an analog signal when the waveform [D] and the waveform [E] are (0, 1) or (1, 0), and an analog signal when the waveform [D] and the waveform [E] are (1, 1). That is, the output signal $V_{out}$ is a three-valued analog signal having three values.

As described above, the output signal $V_{out}$ is a serial signal having a data rate corresponding to a period ½ of that of the waveform [A] of the clock signal CK. That is, the unit interval (UI) of the serial data transmission circuit 1 corresponds to the period ½ of that of the waveform [A] of the clock signal CK. Then, the period of the first to fourth digital signals $D_{in0}$ to $D_{in3}$ input in parallel corresponds to 4UI and the period of the clock signal CK corresponds to 2UI.

As described above, the serial data transmission circuit 1 is explained with reference to FIGS. 2 to 5. In the serial data transmission circuit 1, the 2:1 multiplexers 20 and 21 and the driver circuits 30 and 31 are controlled by the first and second control signals $CNT_1$ and $CNT_2$, the period of which is the period of the clock signal CK doubled by the divide-by-2 frequency divider circuit 10. Thus, in the serial data transmission circuit 1, the element that operates in the period of the clock signal CK is only the divide-by-2 frequency divider circuit 10 surrounded by a broken line indicated by an arrow B in FIG. 2A.

Figure 1A:
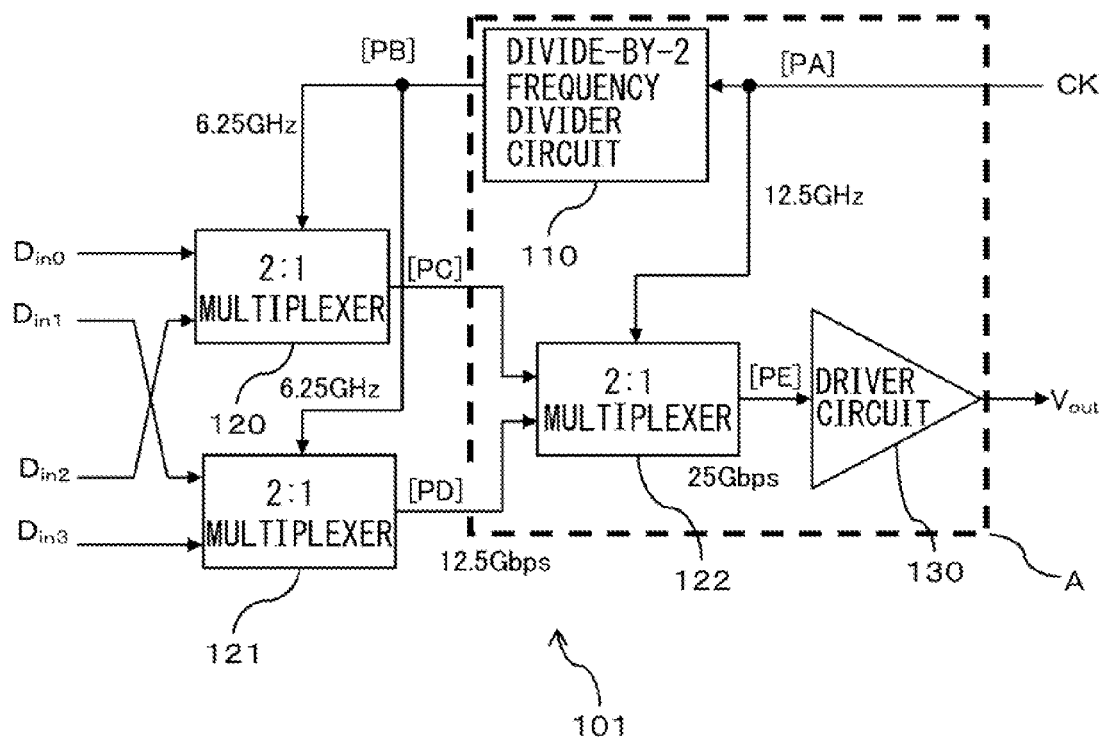
FIG. 1A is a diagram illustrating a conventional serial data transmission circuit.
Figure 1B:
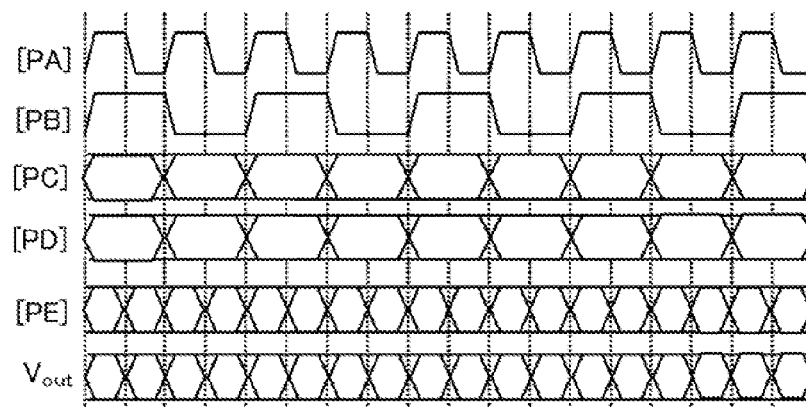
FIG. 1B is a diagram illustrating a conventional serial data transmission circuit.

Compared to the conventional serial data transmission circuit 101 illustrated in FIG. 1A, the elements that operate in the period of the clock signal CK, i.e., one of the 2:1 multiplexers and one of the driver circuits are removed, respectively. Thus, in the serial data transmission circuit 1, the number of elements that operate at a high speed is reduced compared to that of the conventional serial data transmission circuit 101.

The serial data transmission circuit 1 has the two driver circuits 30 and 31, and therefore, compared to the conventional serial data transmission circuit 101 having only the one driver circuit 130, the number of driver circuits is increased. However, there is no possibility that the power consumption of the serial data transmission circuit 1 is increased compared to that of the conventional serial data transmission circuit 101 due to the increase in the number of driver circuits. The reason is that, firstly, in the serial data transmission circuit 1, the outputs of the driver circuits 30 and 31 are combined as an analog signal, and therefore, the driving capability of the driver circuits 30 and 31 may be half that of the driver circuit 130 of the serial data transmission circuit 101. Thus, even when the respective driver circuits are driven at the same frequency, the power consumption of the driver circuits 30 and 31 of the serial data transmission circuit 1 is about half the power consumption of the driver circuit 130 of the conventional serial data transmission circuit 101. Secondly, when outputting a serial signal having the same UI, the data rate of the driver circuits 30 and 31 of the serial data transmission circuit 1 is half the data rate of the conventional serial data transmission circuit 101. In this case, the power consumption of the driver circuits 30 and 31 of the serial data transmission circuit 1 is about a quarter of the power consumption of the driver circuit 130 of the conventional serial data transmission circuit 101. That is, in the serial data transmission circuit 1, the number of driver circuits is increased compared to that of the conventional serial data transmission circuit 101 illustrated in FIG. 1A, however, the power consumption does not increase because the driving capability of each of the driver circuits is reduced and the operating frequency of the driver circuit is low.

Figure 6:
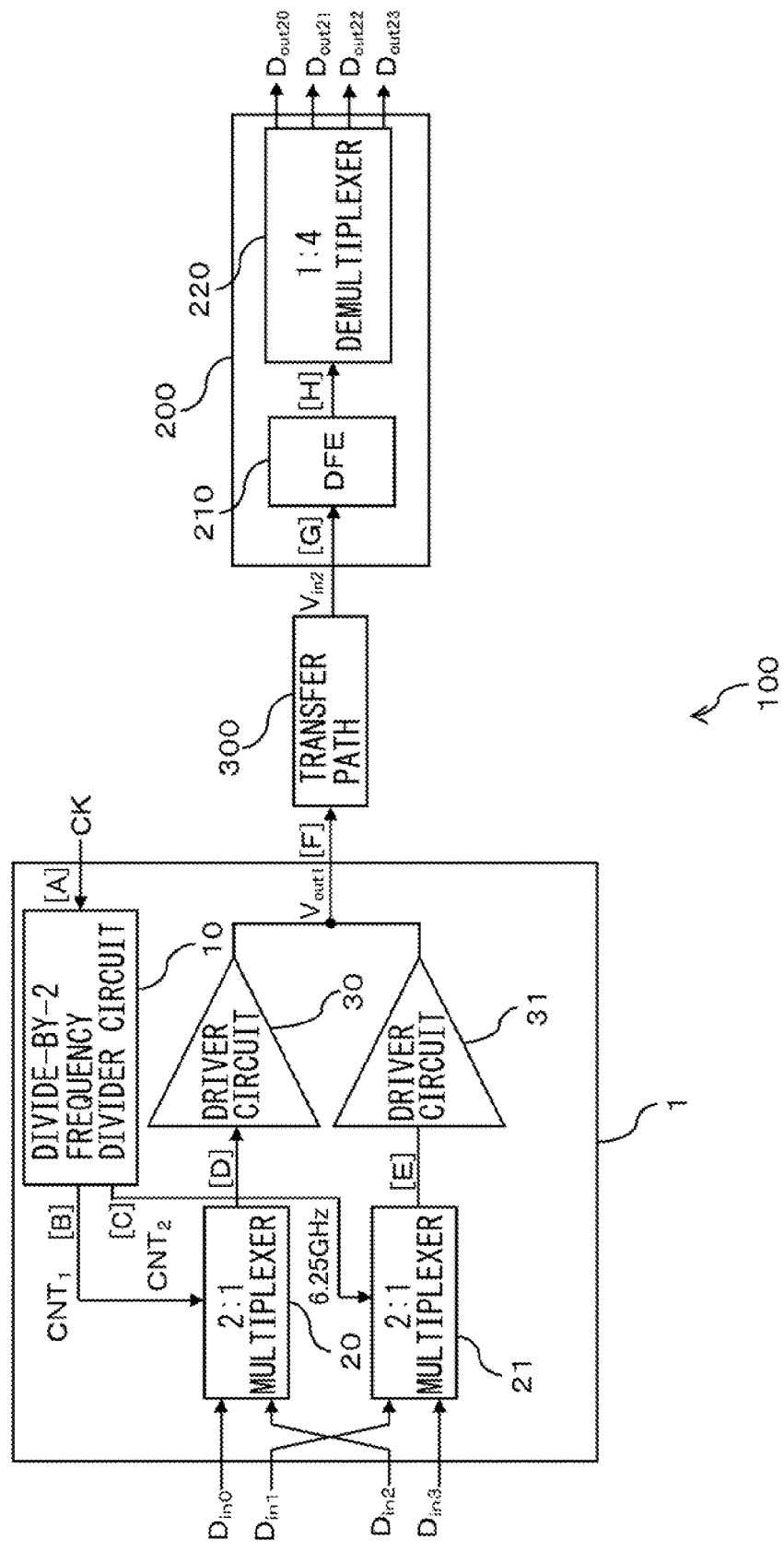
FIG. 6 is a diagram illustrating a block of a communication system including the serial data transmission circuit illustrated in FIG. 2.
Figure 7A:
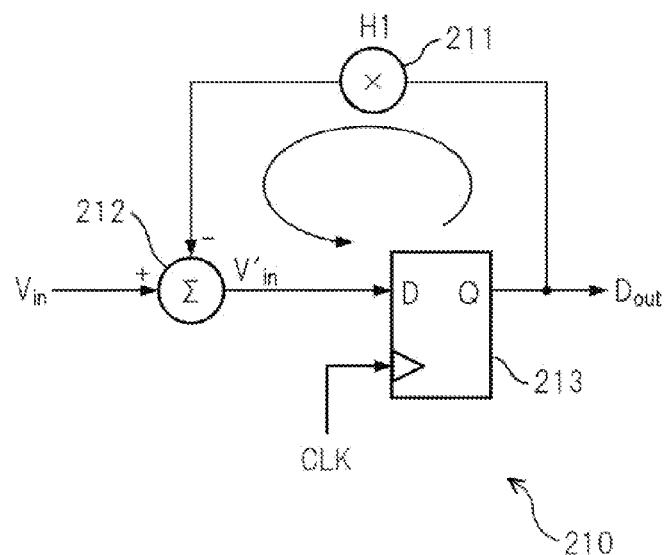
FIG. 7A is a diagram illustrating an example of a circuit of a DFE of a reception circuit illustrated in FIG. 6.
Figure 7B:
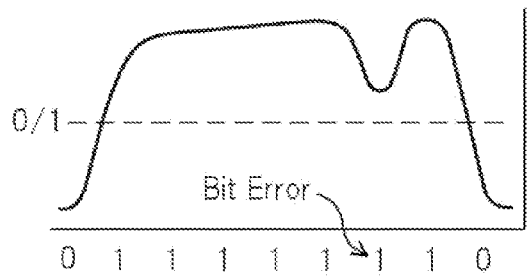
FIG. 7B is a diagram illustrating an example of a circuit of a DFE of a reception circuit illustrated in FIG. 6.
Figure 7C:
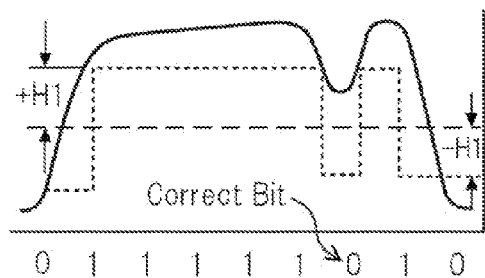
FIG. 7C is a diagram illustrating an example of a circuit of a DFE of a reception circuit illustrated in FIG. 6.
Figure 8:
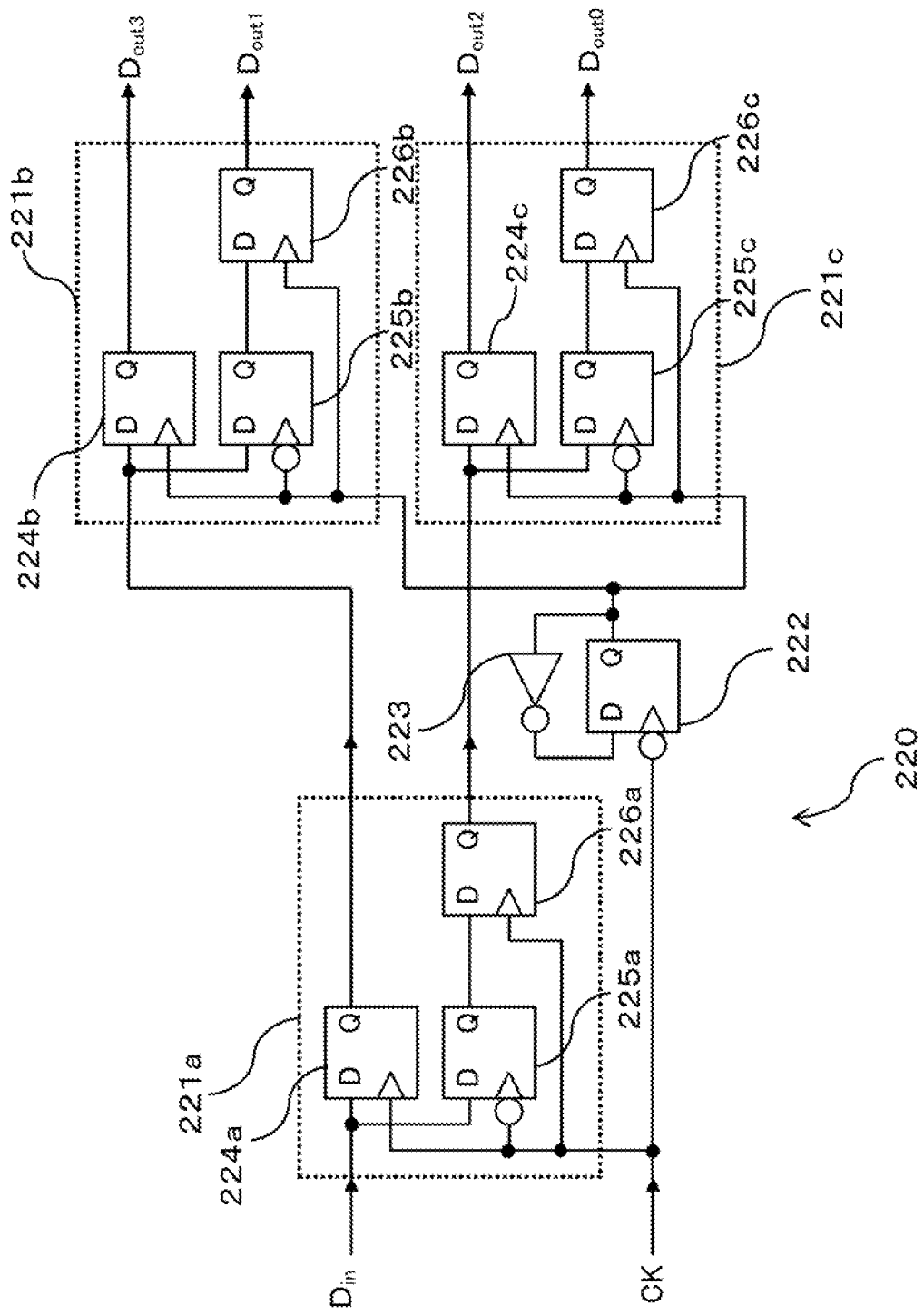
FIG. 8 is a diagram illustrating an example of a circuit of a 1:4 demultiplexer of the reception circuit illustrated in FIG. 6.
Figure 9:
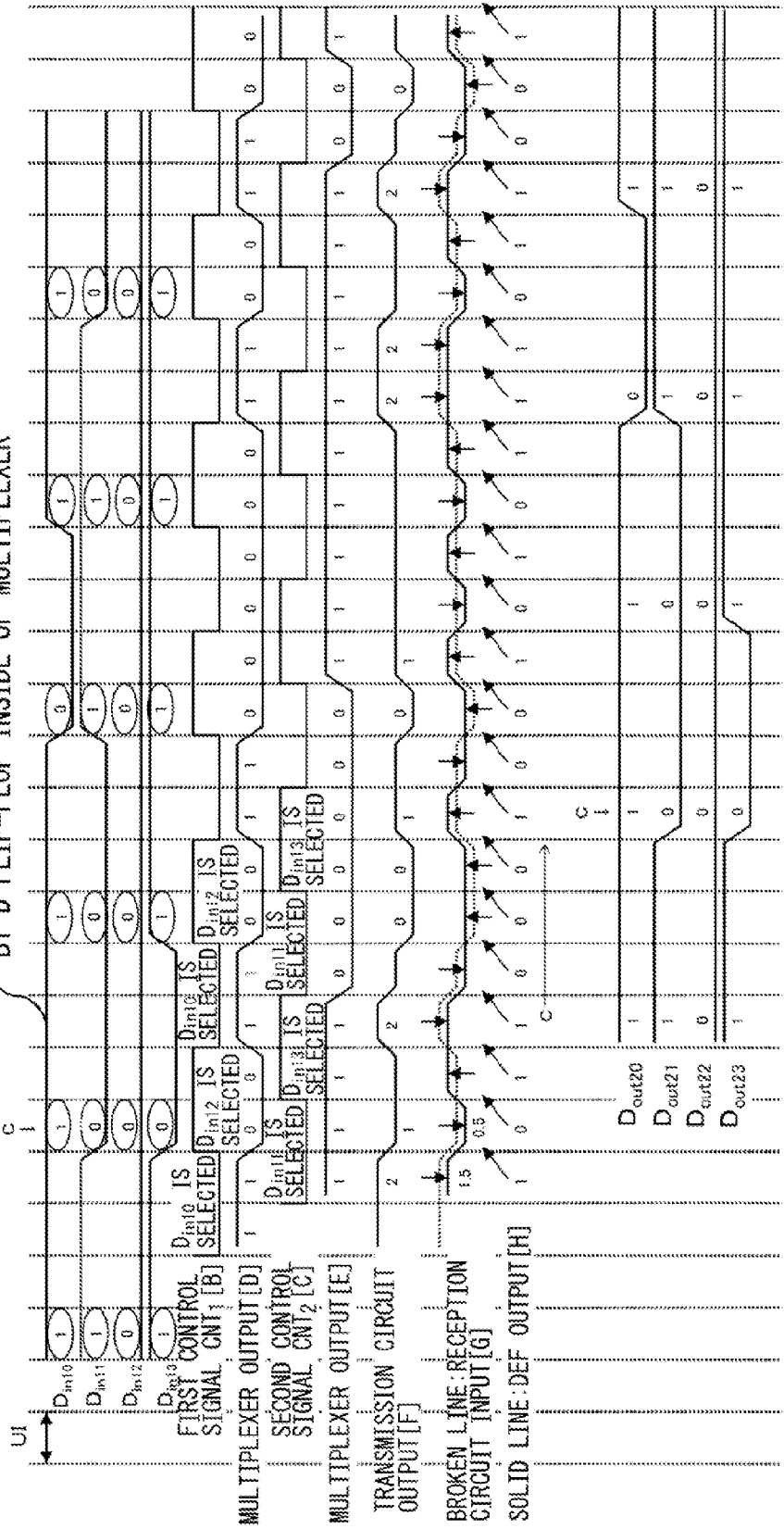
FIG. 9 is a diagram illustrating a time chart of the communication system illustrated in FIG. 6.

Next, with reference to FIGS. 6 to 9, a communication system 100 including the serial data transmission circuit 1 is explained. FIG. 6 is a diagram illustrating a block of the communication system 100. FIG. 7 is a diagram illustrating an example of a circuit of a DFE 210 of a serial signal reception circuit 200 included in the communication system 100 and a related time chart. FIG. 8 is a diagram illustrating an example of a circuit of a 1:4 demultiplexer 220 of the serial signal reception circuit 200 included in the communication system 100. FIG. 9 is a diagram illustrating a time chart of the communication system 100.

The communication system 100 has the serial data transmission circuit 1, the serial signal reception circuit 200, and a transfer path 300. The output end of the serial data transmission circuit 1 is connected to one end of the transfer path 300 and the input end of the serial signal reception circuit 200 is connected to the other end of the transfer path 300. The first to fourth digital input signals $D_{in0}$ to $D_{in3}$ input in parallel to the serial data transmission circuit 1 are output from the serial signal reception circuit 200 as the first to fourth digital output signals $D_{out0}$ to $D_{out3}$ via the transfer path 300. The transfer path 300 is a wire that electrically connects the serial data transmission circuit 1 and the serial signal reception circuit 200.

The serial signal reception circuit 200 has the DFE 210 and the 1:4 demultiplexer 220. The DFE 210 is a signal determination circuit configured to predict distortion of a signal waveform by using the DFE (Decision Feedback Equalization) technique. The DFE 210 has a determination circuit 211, a subtraction circuit 212, and a D flip-flop 213.

The determination circuit 211 outputs one of a predetermined coefficient H1, which is a positive number, and −H1, which is a negative value of the coefficient H1, based on the determination result of a signal input previously. When the previous signal is determined to be 0, the determination circuit 211 outputs −H1. On the other hand, when the previous signal is determined to be 1, the determination circuit 211 outputs H1.

The subtraction circuit 212 subtracts an output signal of the determination circuit 211 from an input signal $V_{in}$. That is, when the previous signal is determined to be 0, the subtraction circuit 212 adds H1 to the input signal $V_{in}$. On the other hand, when the previous signal is determined to be 1, the determination circuit 211 subtracts H1 from the input signal $V_{in}$. In the D flip-flop 213, a signal $V'_{in}$, which is the input signal $V_{in}$ from which ±H1 is subtracted in the subtraction circuit 212, is input to the input terminal D and the D flip-flop 213 outputs the digital signal $D_{out}$, which is 0 or 1, at the rising edge of the clock signal CK from the output terminal Q.

As described above, it is possible for the DFE 210 to determine as a digital signal of 0 or 1 by adjusting a determination threshold value of the next cycle signal to correct the waveform distortion based on the determination result of the previous signal. The DFE 210 illustrated in FIG. 7A has a configuration equivalent to that in which the determination threshold value is changed by subtracting ±H1 from the input signal $V_{in}$ instead of adjusting the determination threshold value. FIG. 7B is a time chart illustrating an example of the determination result by a circuit not having the DFE function and FIG. 7C is a time chart illustrating an example of the determination result of the DFE 210. The bit indicated by an arrow "Bit Error" in FIG. 7B is a bit to be originally determined to be 0, however, the previous signal is 0 and the operating speed is high, and therefore, the bit is erroneously determined before transition is made to the determination threshold value. On the other hand, the bit indicated by an arrow "Correct Bit" in FIG. 7C is determined by the DFE 210 having the effect equivalent to that the determination threshold value is changed, and therefore, the correct determination result is obtained.

In the DFE 210, the amplitude of H1 is specified as an amplitude of a magnitude a quarter of the amplitude of the input signal $V_{in}$ input to the DFE 210. That is, the amplitude of H1 has a magnitude corresponding to the amplitude ½ of that of the output signals of the drivers circuit 30 and 31, respectively, of the serial data transmission circuit 1.

The 1:4 demultiplexer 220 has 1:2 demultiplexers 221a, 221b, and 221c, a D flip-flop 222, and an inverter 223. The 1:2 demultiplexer 221a has D flip-flops 224a, 225a, and 226a. A digital input signal $D_{in}$ input serially and the clock signal CK are input to the 1:2 demultiplexer 221a. The D flip-flop 224a latches the digital signal $D_{in}$ input to the input terminal D at the rising edge of the clock signal CK. The D flip-flop 225a latches the digital signal $D_{in}$ input to the input terminal D at the falling edge of the clock signal CK. The D flip-flop 226a latches the output signal of the D flip-flop 225a input to the input terminal D at the rising edge of the clock signal CK.

The 1:2 demultiplexers 221b and 221c have a circuit configuration equivalent to that of the 1:2 demultiplexer 221a. The D flip-flop 222 and the inverter 223 generate a signal, which is the clock signal CK divided by 2, at the falling edge of the clock signal CK.

The D flip-flop 224b latches the output signal of the D flip-flop 224a at the rising edge of the clock signal CK divided by 2 and outputs the signal as the fourth digital output signal $D_{out3}$ from the output terminal Q. The D flip-flop 225b latches the output signal of the D flip-flop 224a at the falling edge of the clock signal CK divided by 2 and outputs the signal from the output terminal Q. The D flip-flop 226b latches the output signal of the D flip-flop 225c input to the input terminal D at the rising edge of the clock signal CK divided by 2 and outputs the signal as the second digital output signal $D_{out1}$ from the output terminal Q.

The D flip-flop 224c latches the output signal of the D flip-flop 226a at the rising edge of the clock signal CK divided by 2 and outputs the signal as the third digital output signal $D_{out2}$ from the output terminal Q. The D flip-flop 225c latches the output signal of the D flip-flop 226a at the falling edge of the clock signal CK divided by 2 and outputs the signal from the output terminal Q. The D flip-flop 226c latches the output signal of the D flip-flop 225b input to the input terminal D at the rising edge of the clock signal CK divided by 2 and outputs the signal as the first digital output signal $D_{out0}$ from the output terminal Q.

Since the 1:4 demultiplexer 220 has the above described configurations, the 1:4 demultiplexer 220 outputs in parallel the digital input signal $D_{in}$ input serially as the first to fourth digital output signals $D_{out0}$ to $D_{out3}$.

Next, with reference to FIG. 9, the operation of the communication system 100 is explained. First to fourth digital input signals $D_{in10}$ to $D_{in13}$ input in parallel are input in a period of 4UI. The first digital input signals $D_{in10}$ to $D_{in13}$ input in parallel are 1011 and the second digital input signals $D_{in10}$ to $D_{in13}$ are 0001. Ellipses illustrated on the waveforms of the first to fourth digital signals $D_{in10}$ to $D_{in13}$ indicate timings at which the first to fourth digital signals $D_{in10}$ to $D_{in13}$ are latched by the D flip-flops, respectively. The first and third digital signals $D_{in10}$ and $D_{in12}$ are latched by the D flip-flops inside of the 2:1 multiplexer 20, respectively, and the second and fourth digital signals $D_{in11}$ and $D_{in13}$ are latched by the D flip-flops inside of the 2:1 multiplexer 21, respectively.

The waveforms [B] and [D] illustrate the selection state of the digital signal in the 2:1 multiplexer 20. The waveform [B] is the waveform of the first control signal $CNT_1$ input to the 2:1 multiplexer 20 and the waveform [D] is the waveform output from the 2:1 multiplexer 20 based on the first control signal $CNT_1$. When the waveform [B] is 0, the first digital signal $D_{in10}$ is selected in the 2:1 multiplexer 20 and when the waveform [B] is 1, the third digital signal $D_{in12}$ is selected and output as the waveform [D], respectively.

The waveforms [C] and [E] illustrate the selection state of the digital signal in the 2:1 multiplexer 21. The waveform [C] is the waveform of the second control signal $CNT_2$ input to the 2:1 multiplexer 21 and the waveform [E] is the waveform output from the 2:1 multiplexer 21 based on the second control signal $CNT_2$. When the waveform [C] is 0, the second digital signal $D_{in11}$ is selected in the 2:1 multiplexer 21 and when the waveform [C] is 1, the fourth digital signal $D_{in13}$ is selected and output as the waveform [E], respectively.

The waveform [F] illustrates the waveform of the analog signal $V_{out1}$ formed by combining the analog signals output from the driver circuits 30 and 31, respectively, to which the digital signals output from the 2:1 multiplexers 20 and 21 are input. The first signal of the waveform [F] is a signal formed by combining the signal corresponding to the first digital signal $D_{in10}$ and the signal corresponding to the second digital signal $D_{in11}$ as an analog signal and the value is 2. The second signal of the waveform [F] is a signal formed by combining the signal corresponding to the second digital signal $D_{in11}$ and the signal corresponding to the third digital signal $D_{in12}$ as an analog signal and the value is 1. Further, the third signal of the waveform [F] is a signal formed by combining the signal corresponding to the third digital signal $D_{in12}$ and the signal corresponding to the fourth digital signal $D_{in13}$ as an analog signal and the value is 1. Then, the fourth signal of the waveform [F] is a signal formed by combining the signal corresponding to the fourth digital signal $D_{in13}$ and the signal corresponding to the first digital signal $D_{in10}$ as an analog signal and the value is 2.

The waveform [G] indicated by a broken line illustrates an analog signal received by the serial signal reception circuit 200. The delay in the transfer path 300 is not taken into consideration and it is assumed that the analog signal is not attenuated in the transfer path 300. The waveform [G] and the waveform [F] have the same shape. The waveform arranged in close proximity to the waveform [G] illustrates the waveform to be input to the input terminal D of the D flip-flop 213 of the DFE 210. For example, the first signal of the waveform to be input to the input terminal D has a value of 1.5, which is the value of 2 of the waveform [G] from which H1=0.5 is subtracted. This is because the previous input is determined to be 1. Further, the second signal of the waveform to be input to the input terminal D has a value of 0.5, which is the value of 1 of the waveform [G] from which H1=0.5 is subtracted. This is because the previous input is determined to be 1. On the other hand, the third signal of the waveform to be input to the input terminal D has a value of 1.5, which is the value of 1 of the waveform [G] to which H1=0.5 is added. This is because the previous input is determined to be 0.

Table 1 illustrates a relationship between the value of the input signal $V_{in}$ in the DFE 210, the determined value of the previous signal $D_{out}$, and the value of the signal $V'_{in}$ to be input to the input terminal D of the D flip-flop 213. The threshold value of the D flip-flop 213 is "1".

TABLE 1

| | Signal $V'_{in}$ to be input to D flip-flop | | | |
|---|---|---|---|---|
| | | Input signal $V'_{in}$ | | |
| | | 0 | 1 | 2 |
| Previous signal $D_{out}$ | 0 | 0 | 0.5 | 1.5 |
| | 1 | 1 | — | 0.5 | 1.5 |

The data indicated by an arrow C of FIG. 9 illustrates the second digital input signal to be input in parallel to the communication system 100. In this manner, the first to fourth digital input signals $D_{in10}$ to $D_{in13}$ input in parallel as 0001 are output in parallel as first to fourth digital output signals $D_{out20}$ to $D_{out23}$ as 0001 via the digital output signal from the DFE 210 to be output serially.

As described above, with reference to FIGS. 6 to 9, the communication system 100 is explained. In the communication system 100, the output signal from the serial data transmission circuit 1 to be output as a three-valued analog signal is received by the serial signal reception circuit 200, which is the reception circuit including the DFE 210. Thus, the serial data transmission circuit 1 is compatible with the serial data transmission circuit used conventionally, and therefore, it is easy to replace the serial data transmission circuit 1 with another serial data transmission circuit.

Figure 10:
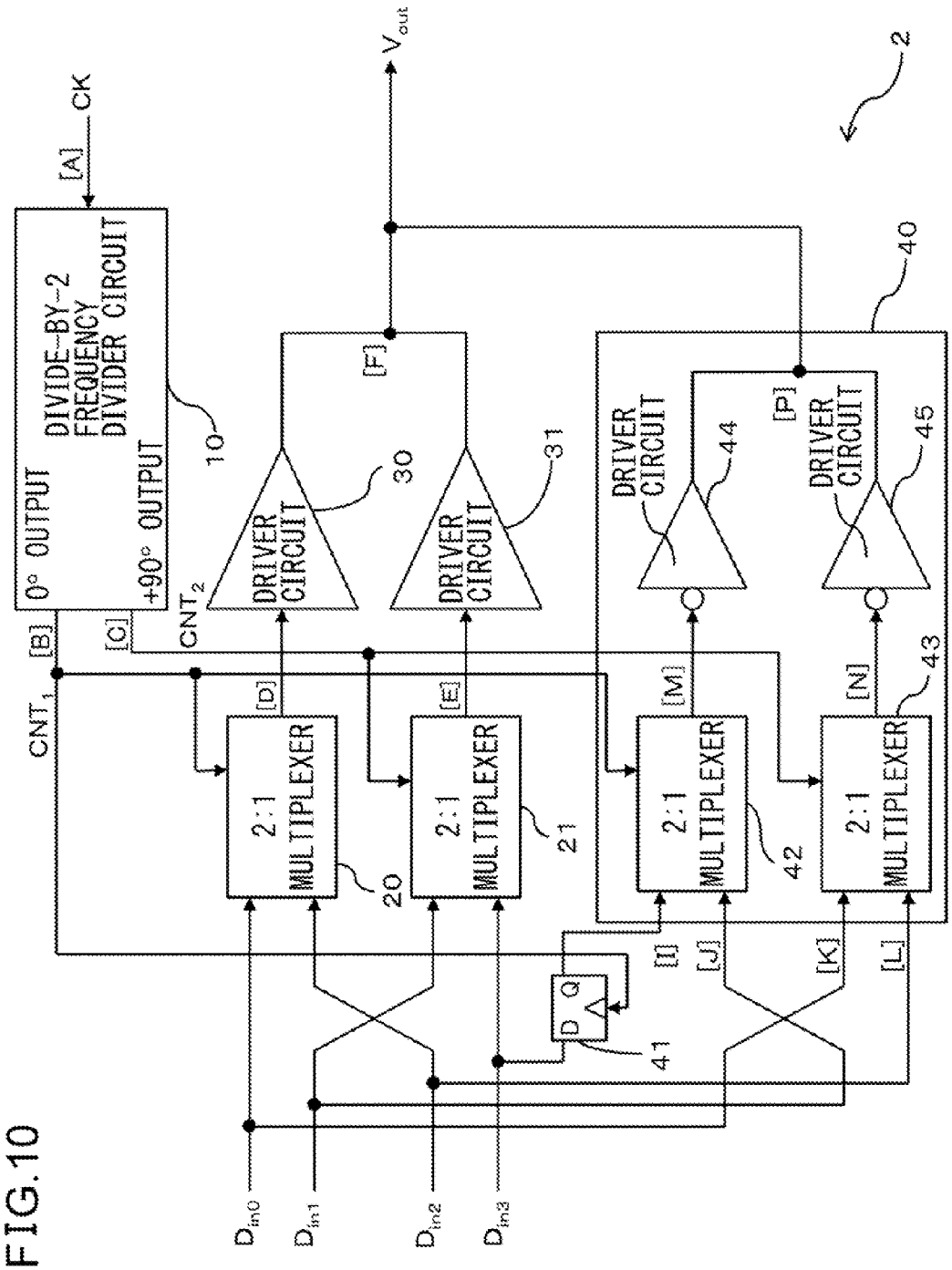
FIG. 10 is a diagram illustrating a block of a serial data transmission circuit of another embodiment.
Figure 11:
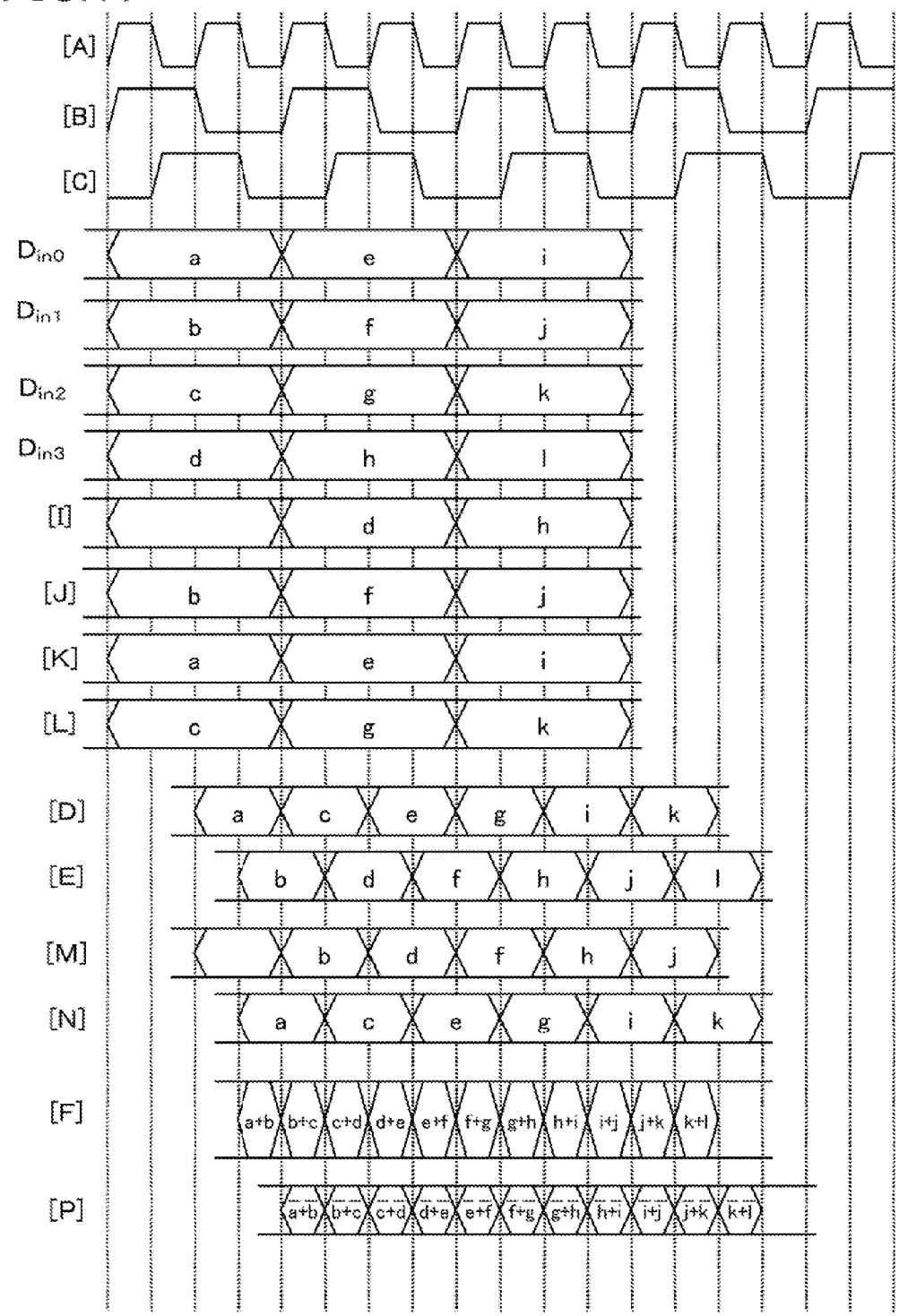
FIG. 11 is a diagram illustrating a time chart of the serial data transmission circuit illustrated in FIG. 10.

Next, with reference to FIGS. 10 and 11, a serial data transmission circuit according to another embodiment is explained. FIG. 10 is a diagram illustrating a block of a serial data transmission circuit 2. FIG. 11 is a diagram illustrating a time chart of the serial data transmission circuit 2.

The serial data transmission circuit 2 illustrated in FIG. 10 differs from the serial data transmission circuit 1 illustrated in FIG. 2 in that the serial data transmission circuit 2 has a post tap unit 40 and a D flip-flop 41 in order to implement the pre-emphasis function. Since serial data transmission circuit 2 has the pre-emphasis function, it is possible for the serial data transmission circuit 2 to compensate for the attenuation of a signal to be transferred by the transfer path 300.

The post tap unit 40 has 2:1 multiplexers 42 and 43, and driver circuits 44 and 45. The 2:1 multiplexers 42 and 43 have the same circuit configuration as that of the 2:1 multiplexers 20 and 21 explained previously. The driver circuits 44 and 45 invert an input digital signal and output the inverted signal as an analog signal. The driving capability of the driver circuits 44 and 45 is lower than that of the driver circuits 30 and 31. That is, the transistors for driving included in the driver circuits 44 and 45 are smaller in size than the first and second transistors 33 and 34 included in the driver circuits 30 and 31.

To the 2:1 multiplexer 42, the fourth digital signal $D_{in3}$ is input via the D flip-flop 41 and at the same time, the second digital signal $D_{in1}$ and the first control signal $CNT_1$ are input. The 2:1 multiplexer 42 outputs a signal corresponding to the fourth digital signal $D_{in3}$ input via the D flip-flop 41 when the first control signal $CNT_1$ is 0 and outputs a signal corresponding to the second digital signal $D_{in1}$ when the first control signal $CNT_1$ is 1.

To the 2:1 multiplexer 43, the first digital signal $D_{in0}$, the third digital signal $D_{in2}$, and the first control signal $CNT_1$ are input. The 2:1 multiplexer 43 outputs a signal corresponding to the first digital signal $D_{in0}$ when the second control signal $CNT_2$ is 0 and outputs a signal corresponding to the third digital signal $D_{in2}$ when the second control signal $CNT_2$ is 1.

The output of the 2:1 multiplexer 42 and the output of the 2:1 multiplexer 43 are inverted, respectively, via the driver circuits 44 and 45 and then combined as an analog signal. Then, the signal formed by combining the output signals of the driver circuits 44 and 45 as an analog signal is combined as an analog signal with the signal formed by combining the output signals of the driver circuits 30 and 31 as an analog signal and output as the output signal $V_{out}$.

In FIG. 11, the waveform [A] illustrates the waveform of the clock signal CK of FIG. 10, the waveform [B] illustrates the waveform of the first control signal $CNT_1$ of FIG. 10, and the waveform [C] illustrates the waveform of the second control signal $CNT_2$ of FIG. 10. Further, waveforms [I] and [J] illustrate the waveform of the input signal of the 2:1 multiplexer 42 and waveforms [K] and [L] illustrate the waveform of the input signal of the 2:1 multiplexer 43. Furthermore, a waveform [M] illustrates the waveform of the output signal of the 2:1 multiplexer 42 and a waveform [N] illustrates the waveform of the output signal of the 2:1 multiplexer 43.

A waveform [F] illustrates the waveform of a signal formed by combining the outputs signals of the driver circuits 30 and 31 of FIG. 10 as an analog signal and a waveform [P] illustrates the waveform of a signal formed by combining the output signals of the driver circuits 44 and 45 as an analog signal. Since the driving capability of the driver circuits 44 and 45 is lower than that of the driver circuits 30 and 31, the amplitude of the waveform [P] is smaller than the amplitude of the waveform [F].

The waveform of the output signal is the waveform formed by combining the waveform [F] and the waveform [P] as an analog signal. Then, the waveform of the output signal will be the waveform formed by combining the current waveform [F] and the waveform formed by inverting the previous waveform [F] and then weighting by reducing the amplitude. Thus, the waveform of the output signal reflects the influence of the previous output signal and implements the pre-emphasis function.

Figure 12:
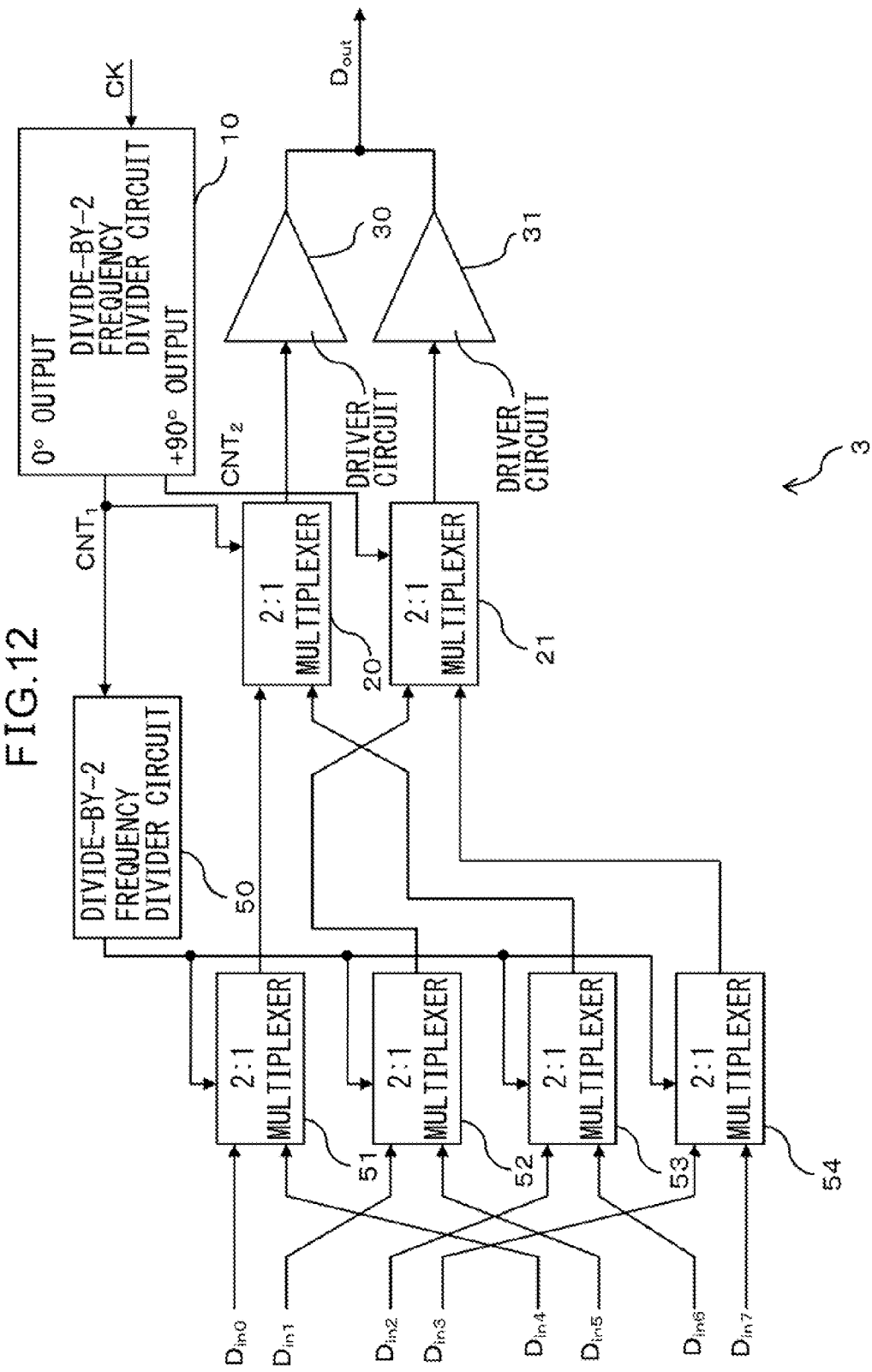
FIG. 12 is a diagram illustrating a block of a serial data transmission circuit of another embodiment.

Next, with reference to FIG. 12, a serial data transmission circuit according to another embodiment is explained. FIG. 12 is a diagram illustrating a block of a serial data transmission circuit 3.

The serial data transmission circuit 3 illustrated in FIG. 12 differs from the serial data transmission circuit 1 illustrated in FIG. 2 in that the number of digital signals input in parallel is not four but eight. Since four digital signals are input in parallel, the serial data transmission circuit 3 has a 1-input/1-output divide-by-2 frequency divider circuit 50 and 2:1 multiplexers 51 to 54.

The 1-input/1-output divide-by-2 frequency divider circuit 50 has the function to further divide by 2 the period of the first control signal $CNT_1$ output from the divide-by-2 frequency divider circuit 10.

To the 2:1 multiplexer 51, the first digital signal $D_{in0}$ and a fifth digital signal $D_{in4}$ are input. The second digital signal $D_{in1}$ and a sixth digital signal $D_{in5}$ are input to the 2:1 multiplexer 52. The third digital signal $D_{in2}$ and a seventh digital signal $D_{in6}$ are input to the 2:1 multiplexer 53. The fourth digital signal $D_{in3}$ and an eighth digital signal $D_{in7}$ are input to the 2:1 multiplexer 54.

The 2:1 multiplexer 51 outputs the first digital signal $D_{in0}$ when the output signal of the 1-input/1-output divide-by-2 frequency divider circuit 50 is 0 and outputs the fifth digital signal $D_{in4}$ when the output signal of the 1-input/1-output divide-by-2 frequency divider circuit 50 is 1. The 2:1 multiplexer 52 outputs the second digital signal $D_{in1}$ when the output signal of the 1-input/1-output divide-by-2 frequency divider circuit 50 is 0 and outputs the sixth digital signal $D_{in5}$ when the output signal of the 1-input/1-output divide-by-2 frequency divider circuit 50 is 1. The 2:1 multiplexer 53 outputs the third digital signal $D_{in2}$ when the output signal of the 1-input/1-output divide-by-2 frequency divider circuit 50 is 0 and outputs the seventh digital signal $D_{in6}$ when the output signal of the 1-input/1-output divide-by-2 frequency divider circuit 50 is 1. The 2:1 multiplexer 54 outputs the fourth digital signal $D_{in3}$ when the output signal of the 1-input/1-output divide-by-2 frequency divider circuit 50 is 0 and outputs the eighth digital signal $D_{in7}$ when the output signal of the 1-input/1-output divide-by-2 frequency divider circuit 50 is 1.

Figure 13A:
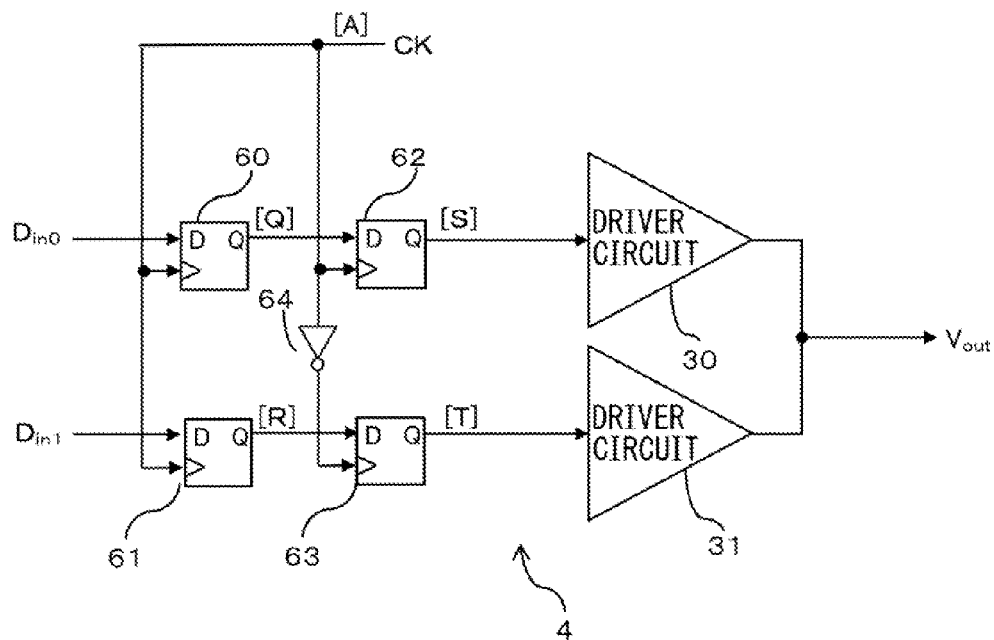
FIG. 13A is a diagram illustrating a block of a serial data transmission circuit of another embodiment.
Figure 13B:
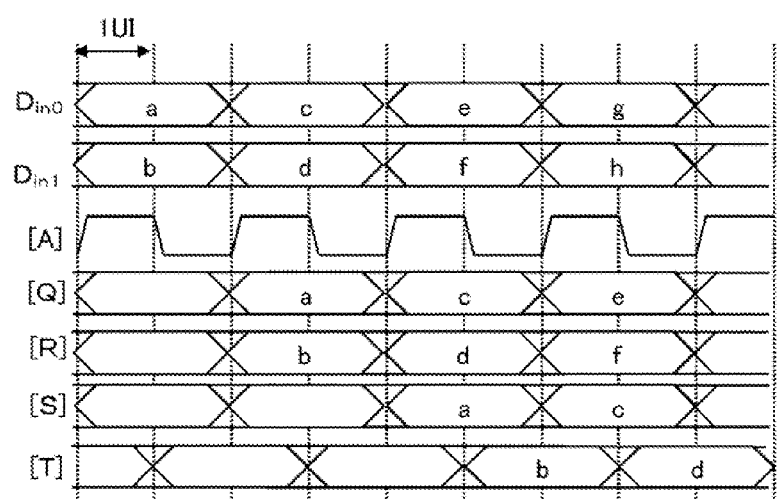
FIG. 13B is a diagram illustrating a block of a serial data transmission circuit of another embodiment.

Next, with reference to FIGS. 13A and 13B, a serial data transmission circuit according to another embodiment is explained. FIG. 13A is a diagram illustrating a block of a serial data transmission circuit 4. FIG. 13B is a diagram illustrating a time chart of the serial data transmission circuit 4.

The serial data transmission circuit 4 illustrated in FIG. 13A differs from the serial data transmission circuit 1 illustrated in FIG. 2 in that the number of digital signals input in parallel is not four but two. The serial data transmission circuit 4 has D flip-flops 60 to 63 and an inverter 64 in the previous stage of the driver circuits 30 and 31. The D flip-flops 60 and 61 latch the first and second digital signals $D_{in1}$ and $D_{in1}$, respectively, input in parallel to the input terminal Q. The D flip-flop 62 latches the first digital signal $D_{in0}$ latched by the D flip-flop 60 at the rising edge of the clock signal CK. On the other hand, the D flip-flop 63 latches the second digital signal $D_{in1}$ latched by the D flip-flop 61 at the falling edge of the clock signal CK. Thus, the first digital signal $D_{in0}$ and the second digital signal $D_{in1}$ are input to the driver circuits 30 and 31, respectively, with a phase difference of a period ½ of that of the clock signal CK. The output signal of the driver circuit 30 and the output signal of the driver circuit 31 are combined as an analog signal and the three-valued analog signal $V_{out}$ with ½ of the period of the clock signal CK being 1 UI is output.

In FIG. 13B, the waveform [A] illustrates the waveform of the clock signal CK, a waveform [Q] illustrates the waveform of the output signal of the D flip-flop 60, and a waveform [R] illustrates the waveform of the output signal of the D flip-flop 61. Further, a waveform [S] illustrates the waveform of the output signal of the D flip-flop 62 and a waveform [T] illustrates the waveform of the output signal of the D flip-flop 63. The waveform [S] and the waveform [T] have a phase difference of ½ of the period of the waveform [A].

As described above, with reference to FIGS. 2 to 13, the embodiments are explained. However, it will be understood that there can be various alterations and modifications to the scope not which do not deviate from the spirit and scope of the present invention.

For example, the serial data transmission circuits 1 to 4 are explained as a circuit configured to supply a serial signal to the transfer path 300, however, the serial data transmission circuits 1 to 4 may be used as a signal combination circuit in another use in which a digital signal input in parallel is output serially. Further, the number of digital signals input in parallel is not limited to those explained in the present specification and the serial data transmission circuit may be one in which a desired number of digital signals, such as 16 and 32, are input in parallel.

Furthermore, the phase difference between digital signals given in the serial data transmission circuits 1 to 4 is not limited to those explained in the present specification and a desired phase difference may be given as long as demodulation can be performed in a serial signal reception circuit adopted in a communication system.

In the transmission circuit, the output of the first drive circuit to which the first digital signal at a data rate of a predetermined period length is input and the output of the second drive circuit to which the second digital signal at a data rate of a predetermined period length shifted by ½ of the predetermined period length relative to the first digital signal are connected. Thus, it is made possible to provide a transmission circuit having a configuration in which the number of elements that operate at a high speed is limited.

All examples and conditional language provided herein are intended for pedagogical purposes of aiding the reader in understanding the invention and the concepts contributed by the inventor to furthering the art, and are to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission circuit comprising:
a phase difference signal generation circuit configured to generate a first digital signal having a predetermined period length and a second digital signal having the predetermined period length delayed by ½ of the predetermined period length relative to the first digital signal by multiplexing in twos selected among a first input digital signal, a second input digital signal, a third input digital signal and fourth input digital signal of data having a double period length twice the predetermined period length, wherein the first digital signal alternately includes the first input digital signal and the third input digital signal, and the second digital signal alternately includes the second input digital signal and the fourth input digital signal;
a first drive circuit to which the first digital signal is input and which is configured to output a signal corresponding to the first digital signal; and
a second drive circuit to which the second digital signal is input and which is configured to output a signal corresponding to the second digital signal, wherein
the outputs of the first drive circuit and the second drive circuit are connected and the connected output indicates the maximum level or the minimum level when the first digital signal value and the second digital signal value are the same and indicates a level between the maximum level and the minimum level when the first digital signal value and the second digital signal value are different.

2. The transmission circuit according to claim 1, further comprising a pre-emphasis signal generation unit configured to shift an inverted signal of the signal corresponding to the connected signal of the connected output by the predetermined period length and to generate a weighted pre-emphasis signal, wherein the output is further connected to the output of the pre-emphasis signal generation unit.

3. The transmission circuit according to claim 1, further comprising:
- a first multiplexer configured to selectively output one of a first signal and a fifth signal as the first input digital signal;
- a second multiplexer configured to selectively output one of a second signal and a sixth signal as the second input digital signal;
- a third multiplexer configured to selectively output one of a third signal and a seventh signal as the third input digital signal; and
- a fourth multiplexer configured to selectively output one of a fourth signal and an eighth signal as the fourth input digital signal.

4. A communication system, comprising:
- the transmission circuit according to claim 1;
- a transfer path the end part of which is connected to the output unit of the transmission circuit; and
- a reception circuit connected to the other end part of the transfer path and having a decision feedback equalizer and a demultiplexer.

5. A transmission circuit according to claim 1, wherein the outputs is three-valued analog signal, and the outputs serially includes a signal which corresponds sum of the first input digital signal and the second input digital signal, a signal which corresponds sum of the second input digital signal and the third input digital signal, a signal which corresponds sum of the third input digital signal and the fourth input digital signal and a signal which corresponds sum of the fourth input digital signal and the first input digital signal.

6. A transmission method, comprising:
- generating a first digital signal having a predetermined period length and a second digital signal having the predetermined period length delayed by ½ of the predetermined period length relative to the first digital signal by multiplexing in twos selected among a first input digital signal, a second input digital signal, a third input digital signal and fourth input digital signal of data having a double period length twice the predetermined period length, wherein the first digital signal alternately includes the first input digital signal and the third input digital signal, and the second digital signal alternately includes the second input digital signal and the fourth input digital signal;
- inputting the first digital signal;
- inputting the second digital signal; and
- transmitting a signal indicating the maximum level or the minimum level when the first digital signal value and the second digital signal value are the same and transmitting a signal indicating a level between the maximum level and the minimum level when the first digital signal value and the second digital signal value are different.

7. A transmission circuit comprising:
- a phase difference signal generation circuit configured to generate a first digital signal having a predetermined period length and a second digital signal having the predetermined period length delayed by ½ of the predetermined period length relative to the first digital signal by multiplexing in twos selected among a first input digital signal, a second input digital signal, a third input digital signal and fourth input digital signals of data having a double period length twice the predetermined period length, wherein the first digital signal alternately includes the first input digital signal and the third input digital signal, and the second digital signal alternately includes the second input digital signal and the fourth input digital signal; and
- an output unit configured to output serially the first digital signal and the second digital signal as an analog output signal combined as an analog signal.

* * * * *